May 19, 1936.    F. C. FRANK    2,041,463
BRAKE
Filed Dec. 19, 1932
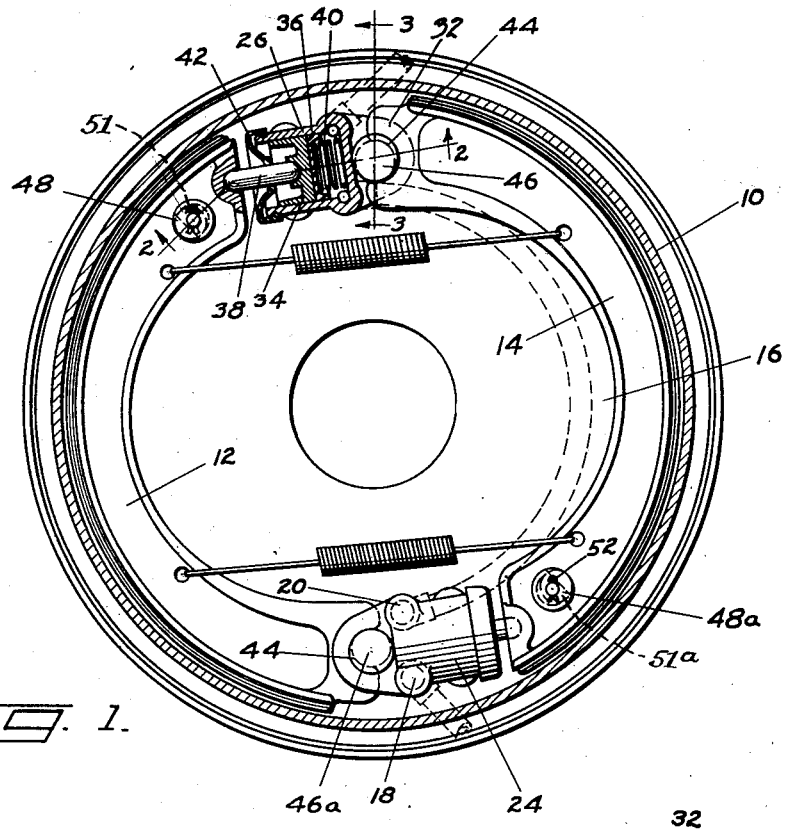
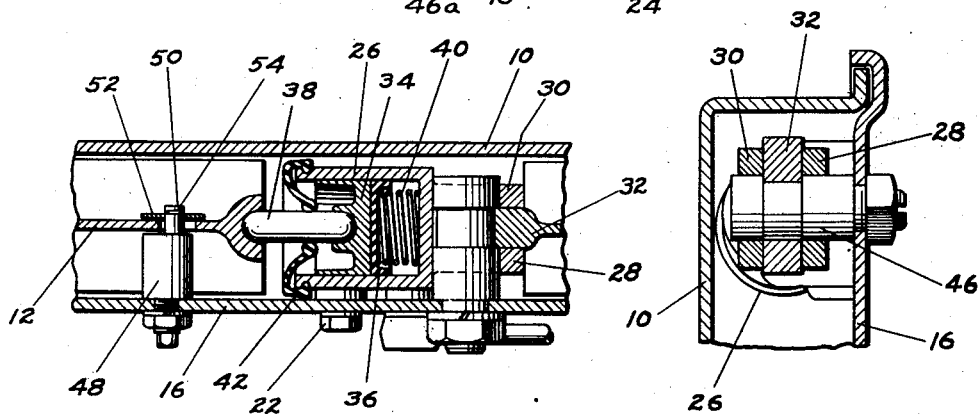
INVENTOR.
FREDERICK C. FRANK
BY Jerome R. Cox
ATTORNEY.

Patented May 19, 1936

2,041,463

UNITED STATES PATENT OFFICE 2,041,463

BRAKE

Frederick C. Frank, South Bend, Ind., assignor to Bendix Aviation Corporation, South Bend, Ind., a corporation of Delaware Application December 19, 1932, Serial No. 647,986

2 Claims. (Cl. 188—152)

This invention relates to brakes and more particularly to brakes especially designed for use on the wheels of an airplane.

One of the objects of the invention is to provide improved means for guiding and limiting the lateral movement of the brake shoes which coact with a brake drum in the braking operation.

A further object is to provide an anchor formed as a part of a brake applying fluid motor, the unit thus serving both as an applying means and an anchoring means.

Features of the invention include a fluid motor cylinder formed with a pair of spaced extensions or forks which are positioned on each side of an associated brake shoe to guide the shoe laterally; an eccentric pin adapted to be adjustably inserted through aligned holes in the spaced extensions for anchoring the shoe; and an adjustable eccentric steady rest pin formed with a shoulder and provided with a washer, the shoulder and washer cooperating to guide the shoe.

Further features and objects of the invention will be apparent after a reading of the subjoined specification and claims and after a consideration of the accompanying drawing, in which:

Figure 1 is a view in vertical section of a brake for an airplane wheel;

Figure 2 is an enlarged view in section taken substantially on the line 2—2 of Figure 1; and Figure 3 is an enlarged view in section taken substantially on the line 3—3 of Figure 1.

Referring particularly to the drawing, there is shown a brake drum 10, equipped with shoes 12 and 14, these shoes being substantially alike. The brake is equipped with a backing plate 16 to which there is secured, by bolts such as 18, 20, and 22, a pair of fluid motors or brake applying cylinders 24 and 26.

The cylinders 24 and 26 are alike and detailed description of one will suffice for both. The cylinder 26 has formed integrally therewith, as is shown most clearly in Figures 2 and 3, a pair of spaced plates 28 and 30 adapted to receive between them the anchoring end 32 of the associated brake shoe, thus guiding the end of the shoe laterally.

As shown in Figures 1 and 2, the cylinder 26 is also provided with a piston 34 equipped with a sealing cup 36, the piston being adapted to bear upon a pin 38 which transmits brake applying force to the free end of the shoe 12. A spring 40 is provided to bear against the closed end of the cylinder and against the cup 36 to maintain the cup in contact with the piston 34. A rubber boot 42 closes the open end of the cylinder to prevent the entrance of dust, etc.

The ends of the shoes 12 and 14, opposite to those against which the pins of the fluid motors act, anchor on the opposite cylinders. To this end the plates 28 and 30 of both cylinders are provided with circular holes such as 44, in each pair of which there is secured an eccentric anchor pin such as 46 and 46a.

Also secured to the backing plate 16 are steady rest bolts 48 and 48a each formed with an eccentric reduced projection 50. The projections 50 extend through D-shaped openings 51 and 51a formed in the shoes 12 and 14 respectively and thus serve to limit the return movement of the shoes when the brake is released. On the end of the projection 50 there is placed a washer 52 held in position by a cotter pin 54, and the web of the shoe 12 is positioned between the enlarged portion of the pin 48 and the washer 52 so that the pins 48 and 48a serve to position the free ends of the shoes laterally. As stated above, the opposite anchored ends of the shoes are positioned laterally by reason of their position between the plates 28 and 30.

It is clear that by rotation of the pin 46 or 46a the eccentric portions 50 are caused to rotate. Inasmuch as the return springs maintain the flat portion of the D slots against the eccentric portions, the return positions of the shoes can thus be accurately controlled by the adjustment. The rounded portions of the D slots allow brake applying movement of the shoes.

It is believed that the operation of the brake described will be apparent from the above disclosure. The supply of braking fluid to the cylinders 24 and 26 causes the pistons to be moved and the shoes 14 and 12 respectively to be moved into contact with the drum 10. Inasmuch as the airplane wheel is only adapted to turn in a forward direction, the rotation of the drum forces the shoes to anchor upon the pins 46 and 46a and through the pins upon the cylinders 26 and 24. The pins 46 and 46a serve, together with the integral plates on the cylinders, to position the shoes laterally of the drum.

It is to be understood that the above described embodiment of the invention is for the purpose of illustration only and various changes may be made therein without departing from the spirit and scope of the invention.

I claim:

1. In a wheel brake; a drum, a backing plate; a pair of eccentric pins secured to said backing plate adjacent to the circumference thereof and positioned substantially diametrically opposite to each other, a pair of shoes positioned in said drum and each having one end formed with a semi-circular recess adapted at times to contact with one of said eccentric pins; a pair of fluid motors each formed integrally with a pair of spaced plates, each plate being provided with a circular hole through which one of said eccentric pins extends and each plate extending on the opposite side of said pin from the motor and the two plates embracing between them the recessed end of the shoe contacting with the associated pin; and a piston in each of said motors for moving the friction shoe other than the one which contacts with the adjacent pin into contact with the drum, whereby the eccentric pin and the spaced plates cooperate to limit the movement of the recessed end of the floating shoe both laterally and circumferentially.

2. In a wheel brake; a drum, a backing plate; a pair of eccentric pins secured to said backing plate adjacent to the circumference thereof and positioned substantially diametrically opposite to each other, a pair of shoes positioned in said drum and each having one end formed with a semi-circular recess adapted at times to contact with one of said eccentric pins; a pair of fluid motors each formed integrally with a pair of spaced plates, each plate being provided with a circular hole through which one of said eccentric pins extends and each plate extending on the opposite side of said pin from the motor and the two plates embracing between them the recessed end of the shoe contacting with the associated pin; and a piston in each of said motors for moving the friction shoe other than the one which contacts with the adjacent pin into contact with the drum, whereby the eccentric pin and the spaced plates cooperate to limit the movement of the recessed end of the floating shoe both laterally and circumferentially, said eccentric pin being formed with a reduced concentric portion extending through and secured to the backing plate, an enlarged concentric portion extending through one of said spaced plates, an eccentric portion adapted to contact with the recessed end of the associated shoe, and another enlarged concentric portion extending through the other spaced plate.

FREDERICK C. FRANK.